United States Patent
Kumar et al.

(10) Patent No.: US 12,474,998 B2
(45) Date of Patent: Nov. 18, 2025

(54) ADAPTIVE RESOURCE ALLOCATION USING DATA CRITICALITY FOR PROTECTION POLICIES

(71) Applicant: Dell Products L.P., Round Rock, TX (US)

(72) Inventors: Avinash Kumar, Patna (IN); Mahesh Reddy Av, Bangalore (IN); Terry O'Callaghan, Hopkinton, MA (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/352,262

(22) Filed: Jul. 14, 2023

(65) Prior Publication Data

US 2025/0021441 A1    Jan. 16, 2025

(51) Int. Cl.
*G06F 11/14* (2006.01)
*G06N 20/00* (2019.01)

(52) U.S. Cl.
CPC ...... *G06F 11/1461* (2013.01); *G06F 11/1453* (2013.01); *G06F 11/1464* (2013.01); *G06N 20/00* (2019.01); *G06F 2201/84* (2013.01)

(58) Field of Classification Search
CPC ............. G06F 11/1461; G06F 11/1453; G06F 11/1464; G06F 2201/84; G06N 20/00
See application file for complete search history.

(56) References Cited

U.S. PATENT DOCUMENTS

| | | | |
|---|---|---|---|
| 10,237,343 B1* | 3/2019 | Wigmore | H04L 67/51 |
| 11,448,598 B1* | 9/2022 | Bhartia | G01N 21/359 |
| 2007/0283017 A1* | 12/2007 | Anand | G06F 11/1464 711/162 |
| 2010/0293147 A1* | 11/2010 | Snow | G06F 16/10 707/E17.007 |
| 2014/0089511 A1* | 3/2014 | McLean | G06F 9/5061 709/226 |
| 2018/0039418 A1* | 2/2018 | Allen | G06F 3/0649 |
| 2019/0392075 A1* | 12/2019 | Han | G06F 16/285 |
| 2020/0097309 A1* | 3/2020 | Chopra | G06F 9/455 |
| 2020/0348979 A1* | 11/2020 | Calmon | G06F 9/5027 |
| 2021/0240576 A1* | 8/2021 | Appireddygari Venkataramana | G06F 3/061 |
| 2022/0012672 A1* | 1/2022 | Inman | G06Q 10/1053 |
| 2022/0035784 A1* | 2/2022 | Kambhammettu | G06F 16/2453 |
| 2022/0326999 A1* | 10/2022 | Penney | G06F 9/5027 |
| 2022/0342774 A1* | 10/2022 | Butucea Panait | G06N 3/09 |
| 2022/0382780 A1* | 12/2022 | Kumar | G06N 20/00 |

* cited by examiner

*Primary Examiner* — Jensen Hu
(74) *Attorney, Agent, or Firm* — Staniford Tomita LLP

(57) ABSTRACT

The backup schedule for a group of routine or known clients and data objects is generally defined by default backup policies and priorities, and such policies and data assets demand resources of the system. The resource allocation among data assets being processed is analyzed and reallocated (tuned) as necessary to ensure that critical data assets are provided with the necessary resources for their protection operations. Embodiments use a machine learning (ML) model that would identify the resource consumption for the all the running policies to smartly allocate the optimal number of resources based on the criticality of the data object and their policies.

18 Claims, 6 Drawing Sheets

100

STORAGE/BACKUP
MANAGEMENT
PROCESS
112

124

102

Adaptive Resource
Allocation based on
Data Criticality
120

Storage
Server

NETWORK STORAGE

114

NETWORK
110

104

108

VM STORAGE

DATA SOURCE

DATABASE
PROCESSES
116

106
DB
Server

CLIENTS
224

STORAGE
SYSTEM
206

NETWORK
210

Metadata

Backup Data

BACKUP
SERVER
202

ADAPTIVE
RESOURCE
ALLOCATION
PROCESS
220

BACKUP
MANAGEMENT
PROCESS
212

ADAPTIVE RESOURCE ALLOCATION COMPONENT 301

DATA RECEIVER
302

KNN-BASED
CLASSIFIER
304

TAGGER
306

MODEL
308

RESOURCES
ALLOCATED
AMONG
PROTECTION
POLICIES
310

FIG. 3

```
                 Process Scheduled Data Protection Policy Using Adaptive Resource
                                       Allocation Component
  600                                           602

KNN-based Trained Model Studies the Resource Usage and Predicts
              Consumption and quantifies an adaptive resource value
                                       604

Provide Adaptive Resource Value with set of best configuration
         parameters to the Backup Server to suggest an Optimum Allocation to
                              the Data Protection Server
                                        606

Use KNN Classifier to Classify Criticality of the Data Asset
                                             607

Tag Data Asset Processed by the Policy with Criticality Tag based on
                                     Defined Attributes
                                            608

Tune Resource Consumption of the Policy based on Criticality of Data
                                             610

Execute Resource Optimized Policy on Data Asset
                                            612

Run Policy in defined time intervals to gain and train more data to
                         continuously tune resource consumption
                                          614

Successfully Complete Backup Operation using tuned protection policy
                                         616
```

FIG. 6

ADAPTIVE RESOURCE ALLOCATION USING DATA CRITICALITY FOR PROTECTION POLICIES

TECHNICAL FIELD

Embodiments are generally directed to large-scale backup systems and more specifically to optimally allocating resources based on the criticality of data objects to be protected.

BACKGROUND

With ever increasing amounts of data and the need for scalability in enterprise level data systems, the data to be backed up and restored can vary widely with regards to criticality. In normal cases, most data is routine business or operational data that is backed up on a daily or weekly basis per normal protection policies that dictate backup period, storage target, retention period, and so on. Frequently, however, certain data may be critical or sensitive in nature, and needs to be protected by different policies.

In a large-scale system with many clients and types of data savesets, limited processor and storage resources must be allocated in as appropriate a manner to ensure that service level agreements (SLAs) and/or service level objectives (SLOs) defined by the backup system vendors are met. Present data protection systems generally do not have an adaptive mechanism to allocate the available resources smartly for the running policies based on the criticality. Because of this, there is high risk of being some of policies or policy rules remaining unattended or assigned with lesser resources regardless the criticality of the data object in the protection policy.

What is needed, therefore is an adaptive data protection system that allocates backup resources based on the criticality of clients and data assets covered by the data protection policies.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions. Data Domain, Data Domain Restorer, and PowerProtect are trademarks of DellEMC Inc.

BRIEF SUMMARY OF EMBODIMENTS

Embodiments are directed to a data protection system that utilizes certain supervised learning (e.g., KNN-based) processes using data criticality for tagged clients to provide adaptive resource allocation when executing backup requests. Such embodiments overcome present system disadvantages of performing manual steps for the resource management and allocation, where the resource assignment does not use any smart or adaptive mechanism while carrying out a backup operation. Embodiments overcome problems caused by allowing available resources to be allocated to less critical data objects while a critical data object can be kept on a waiting state.

The backup schedule for a group of routine or known clients and data objects is generally defined by default backup policies and priorities, and such policies and data assets demand resources of the system. The resource allocation among data assets being processed is analyzed and reallocated (tuned) as necessary to ensure that critical data assets are provided with the necessary resources for their protection operations. Embodiments use a machine learning (ML) model that would identify the resource consumption for the all the running policies to smartly allocate the optimal number of resources based on the criticality of the data object and their policies.

Embodiments are directed to an intelligent solution to data protection ecosystems to meet the SLA and SLO requirements of vendors through an adaptive resource allocation system and method that uses certain artificial intelligence (AI) and machine learning (ML) based solutions, such as a KNN-based classifier.

BRIEF DESCRIPTION OF THE DRAWINGS

In the following drawings like reference numerals designate like structural elements. Although the figures depict various examples, the one or more embodiments and implementations described herein are not limited to the examples depicted in the figures.

FIG. 1 illustrates a computer network system that implements one or more embodiments of a backup system using supervised learning to implement adaptive resource allocation for data protection and backup operations.

FIG. 2 illustrates a backup system with a variety of different backup clients generating data to be protected, under some embodiments.

FIG. 3 is a block diagram of an adaptive resource allocation component, under some embodiments.

FIG. 6 is a flowchart that illustrates a method of providing adaptive resource allocation using data criticality for tagged data and clients, under some embodiments.

DETAILED DESCRIPTION

Figure 4:
FIG. 4 illustrates an example depiction of a KNN implementation for adaptive resource allocation, under some embodiments.

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. In this specification, implementations, or any other form that the invention may take, may be referred to as techniques. In general, the order of the steps of disclosed processes may be altered within the scope of the invention.

Some embodiments of the invention certain computer network techniques deployment in a distributed system, such as a very large-scale wide area network (WAN), metropolitan area network (MAN), or cloud based network system, however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network.

Data protection systems involve backing up data at regular intervals for restoration, replication, or data move operations based on user need and/or data corruption events. To reduce the sheer amount of data that is backed up and stored, such systems typically use some form of deduplication to eliminate redundant copies of data, such as might be present with data that is frequently backed up, but not as frequently changed in between each backup period.

The Data Domain File System (DDFS) is an example of one such deduplication file system. As the data is ingested, the filesystem anchors and segments the data. The filesystem keeps track of segments which are stored on the disk, and if the segments were to be seen again, the filesystem would just store the reference to the original data segment which was written to disk. Deduplication backups often involve periodic full backups of backup clients by the backup server followed by one or more incremental backups that backup only that data that has changed from a last full backup. Because of the sheer number of backup clients and the amount of data in a large scale data processing system, such backups can be very time and processor intensive.

In order to provide appropriate backup protection to users, data protection vendors often implement certain service level agreements (SLAs) and/or service level objectives (SLOs) to define and quantify certain minimum requirements with regard to backup performance. These parameters usually define characteristics such as maximum backup time per session, minimum data throughput rates, maximum data restore times, data storage terms, and so on. The vendor and/or user is allowed to define policies that control backup operations, such as backup schedules, identity and priority of backup clients and storage targets, backup data types, and so on, and such policies are usually written so that the SLA and SLO requirements are met. However, the dynamic and changing nature of different clients and data types in a backup dataset means that these policies must be similarly adaptable and dynamic to accommodate such changes.

As stated above, most backup operations involve datasets that are anticipated over the course of normal operations, and backed up through standard policies, such as daily or weekly backups to normal storage targets. Occasionally though, critical data may be introduced that needs to be treated differently with regard to backup periods, handling, and/or storage targets. For example, critical and/or sensitive (confidential) data objects may need to be backed up immediately to local storage instead of waiting for the next incremental backup to cloud storage, and so on. To accommodate such requests, embodiments are directed to a method for intelligent policy creation for special or "adhoc" backups using client tagging. FIG. 1 illustrates a computer network system that implements one or more embodiments of a backup system using adaptive resource allocation.

In system 100 of FIG. 1, a storage server 102 executes a data storage or backup management process 112 that coordinates or manages the backup of data from one or more data sources 108 to storage devices, such as network storage 114, client storage, and/or virtual storage devices 104. With regard to virtual storage 104, any number of virtual machines (VMs) or groups of VMs (e.g., organized into virtual centers) may be provided to serve as backup targets. The VMs or other network storage devices serve as target storage devices for data backed up from one or more data sources, such as storage server 102 or data source 108, in the network environment. The data sourced by the data source may be any appropriate data, such as database data that is part of a database management system, and the data may reside on one or more hard drives for the database(s) in a variety of formats. Thus, a data source maybe a database server 106 executing one or more database processes 116, or it may be any other sources data for use by the resources of network 100.

The network server computers are coupled directly or indirectly to the data storage 114, target VMs 104, and the data sources and other resources through network 110, which is typically a cloud network (but may also be a LAN, WAN or other appropriate network). Network 110 provides connectivity to the various systems, components, and resources of system 100, and may be implemented using protocols such as Transmission Control Protocol (TCP) and/or Internet Protocol (IP), well known in the relevant arts. In a cloud computing environment, network 110 represents a network in which applications, servers and data are maintained and provided through a centralized cloud computing platform.

The data generated or sourced by system 100 and transmitted over network 110 may be stored in any number of persistent storage locations and devices. In a backup case, the backup process 112 causes or facilitates the backup of this data to other storage devices of the network, such as network storage 114. In an embodiment network 100 may be implemented to provide support for various storage architectures such as storage area network (SAN), Network-attached Storage (NAS), or Direct-attached Storage (DAS) that make use of large-scale network accessible storage devices 114, such as large capacity disk (optical or magnetic) arrays, such as RAID (redundant array of individual disk) arrays. In an embodiment, system 100 may represent a Data Domain Restorer (DDR)-based deduplication storage system, and storage server 102 may be implemented as a DDR Deduplication Storage server provided by EMC Corporation. However, other similar backup and storage systems are also possible.

As shown in FIG. 1, system 100 includes an adaptive resource allocation component 120 that incorporates intelligence to automatically accommodate adhoc backup requests for new data objects using certain tagging and AI-based classification technologies.

In many a typical large-scale data protection system, there can be many different types of backup clients, each generating different data objects at different times to be included in one or more data savesets. FIG. 2 illustrates a backup system like that of FIG. 1, but with a variety of different backup clients 224, ranging from computers, laptops, mobile devices, network devices, servers, and so on, all backing up data and metadata over network 210 through backup server 202 to storage system 206 using a backup program 212. Each client generally represents a device used by a user in a variety of different ways, such as for productivity (e.g., laptop/desktop computers), communications (e.g., mobile phones), applications (e.g., tablet computers), and so on. Other clients may include sensors, IoT (Internet of Things) devices, network interfaces, and other similar devices that generate data. Each client 224 may thus generate different data that maybe subject to different protection policies based on data type, importance, volume, storage requirements, and so on.

In a large-scale disparate network, such as system 200, the different clients may all generate great amounts of data that require invoking any number of protection policies. The data protection resources of such a system include the backup server CPU resources to execute backup/restore operations, data storage devices (targets), interfaces and links to transmit the data, and management overhead to manage the data protection operations. These are just some example resources that are impacted by protecting assets in a large scale system. In a typical system, not all resources are available at all times for all assets. Therefore, some degree of conflict may exist when overlapping processing threads are created and scheduled to be backed up at the same time, or to the same target, or through the same policy. In such a case, protection of sensitive, important or otherwise critical data may be pre-empted by lesser critical data that may happen to be processed at the same time.

To ensure adequate protection of the data in accordance with the importance of the data, embodiments of systems 100 and 200 include respective adaptive resource allocation processes 120 and 220 that invoke protection operations based on a relative data criticality measure for the data. Embodiments described below may apply to either component 120 in the basic backup system of FIG. 1, or component 220 in the multi-client backup system of FIG. 2.

The component (120 or 220) provides adaptive resource allocation and application to adhoc backups, which are backups where a large customer environment incorporates additional data objects outside of the planned operation cycle, and that may include critical data requiring special protection treatment. As stated previously, present systems may service non-critical data first. Embodiments of the adaptive resource allocation process 220 provide an intelligent solution powered by machine learning that will prioritize backups based on data criticality. For example, consider a customer environment experiences a drastic increase in customers resulting in a number of virtual machines (VMs) being added during the handling of a significant unexpected data change. In this case, process 220 will dynamically schedule the backup of these VMs according to the criticality of the application or applications that they are hosting.

The adaptive resource allocation process 220 that provides the system with an smart and automated way of handling any new data object into the overall data protection program including new clients 124, adhoc backups, new datasets, and so on. Such data objects can be new or different data objects for a particular client, or different data objects generated by different clients 124.

FIG. 3 is a block diagram of an adaptive resource allocation component 301, under some embodiments. As shown in FIG. 3, component 301 includes a data receiver 302 that receives data objects that can be considered "critical" or "sensitive" data and comprises data that is protected through enhanced or different policies as compared to "normal" data backed up and restored through routine or defined protection policies.

The received critical data objects are classified by a classifier process 304 as either critical or non-critical. The clients generating this data can also be classified as critical along with their data objects. The data that is classified as critical is then appropriately tagged through tagger 306 with certain metadata using a tagging process to signify important criticality parameters, such as data type, protection priority, special handling, and so on to match with appropriate protection policies.

Various different parameters can be used to determine the criticality of data objects, such as data type, data source, storage requirements, lifecycle, application, user, backup completion time, success rate, data corruption history, resource utilization, data change rate, number of copies, retention time, and so on. Other parameters for both client and data may include: critical strings, nature of the application being hosted, number of applications, size, data leg, device ports, data path available, datastore size, provisioning details, and so on. The tagged data is then protected through the appropriately selected policy 310.

The tagger 306 assigns criticality tags to data objects to ensure they are aligned with the appropriate backup protection policy and cycles. In an embodiment, the criticality tags are classified as P0 (highest priority tag), P1, P2, and so on, but any other or similar hierarchical tag may be used. In an embodiment, the tag comprises a key value having a format of "CRITICALITY_TAG" with an associated encoded scalar value (e.g., P0, P1, P2, etc.), wherein the associated value represents a priority value of a critical data object ranked along a defined scale, and wherein the defined scale is on the order of 1 to 5, in one of ascending or descending order of priority. Such scale levels can also be associated with qualitative descriptions, such as Platinum/Gold/Bronze, or High/Medium/Low, etc. to align with corresponding protection policies.

To tag the client and its data objects, component 301 uses a KNN ML (machine learning) model for classifier 304. First, the client is tagged based on high-risk and criticality factors, and then the data objects under the client are tagged. For example, a client hosting a security-related application will be given a higher priority tag than a client hosting a gaming application. Similarly, a data object such as a file system under the tagged client will undergo further tagging based on the criticality factor of the file system and its usage.

With respect to the KNN-based classifier 304: KNN basically stand for k-nearest neighbors (KNN) algorithm, and is a classification algorithm that can be well used in case of classification and regression scenarios. KNN is a supervised learning algorithm that is dependent upon the labelled input data to study a function that would produce an output when a new unlabeled data is given as input. It classifies the data point on how its neighbor is classified. The basic principle of this model is to classify any new input data based on the similarity measure of the data points which was stored earlier. For example, consider a dataset of Coconut and Grapes. The KNN model will get trained with similar measures like shape, color, weight, etc. When some fruit comes, KNN will try to match its similarity with the color (red or yellow), weight and shape.

A similar analogy can be made with the properties of data object that are used in tailoring the KNN model to fit the embodiment of FIG. 2. For example, if there are two Virtual Machines (Critical and Non-Critical) as labeled data, both would have a set of attributes like: critical strings, nature of the application being hosted number of applications, size, data leg, device ports, data path available, datastore size, provisioning details and so on. This represents only some criticality attributes or parameters (characteristics) and embodiments are not so limited. Any other or additional parameters characterizing the criticality, sensitivity, or specialness of a new data object may be used. Any new introduced data object into the system can be predicted to be classified into a critical or non-critical based on these attributes.

FIG. 4 illustrates a simple example depiction of a KNN implementation that can be used for an adaptive resource allocation process, under some embodiments. Plot 400 of FIG. 4 shows that if a new input (star) is to be classified into a circle 406 or rectangle 404, then the KNN model would calculate the Euclidian distance between the "Star-Circle" and "Star-Rectangle" for three occurrences (K=3). Since the 3 Circles are closest to the new data (star), so the category of this can be classified as circle.

Figure 5:
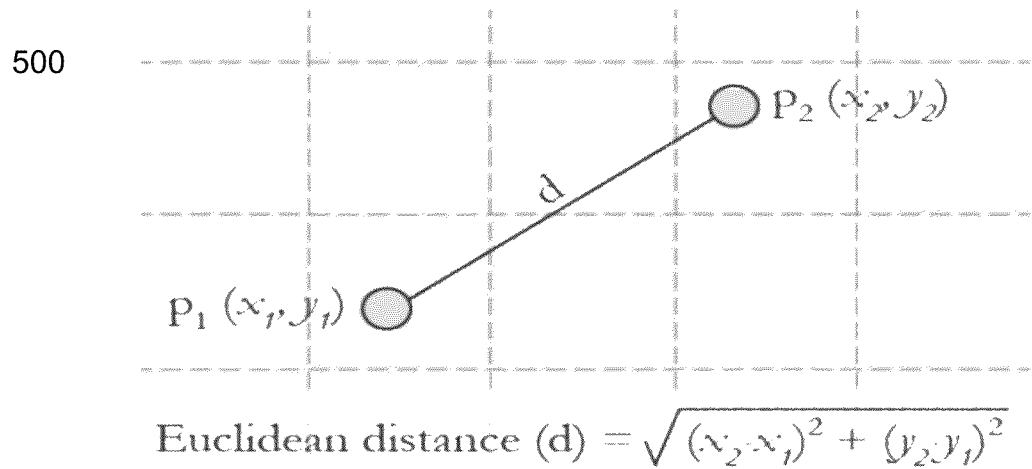
FIG. 5 illustrates a plot representation for the calculation of Euclidean distance for a KNN implementation, under some embodiments.

FIG. 5 illustrates a plot representation 500 for the calculation of Euclidean distance for a KNN implementation, under some embodiments. As shown in FIG. 5, the Euclidean distance (d) between points $P_1$ ($x_1$, $y_1$) and $P_2$ ($x_2$, $y_2$) is calculated by the following formula:

$$d = SQRT((x_2 - x_1)^2 + (y_2 - y_1)^2)$$

For some embodiments of FIG. 1, the KNN model used in this solution leverages multiple parameters to decide the criticality of new data objects received to balance resources used for the data assets to which protection policies are applied. The model 308 for the KNN classifier 304 is trained with historical data of the clients, datasets, and backups from users and certain laboratory environments to ensure maximum accuracy in the prioritization of new backup objects. The historical data may be amassed from many years operation of deployed systems as well as theoretical or simulated data provided through laboratory simulations. It may also comprise current user configuration and deployment information including presently desired or used attributes and corresponding values.

As shown in FIG. 3, the criticality encoded in the tagged data assets is used to identify the resource consumption for the all the running policies and smartly allocate the optimal number of resources based on the criticality of the data object and their policies, 310. The model utilizes several of the attributes listed above (e.g., backup completion time, success rate, data corruption history, resource utilization, data change rate, number of copies, retention time, etc.). The predicted quantity of resources is then provided continuously as an input to the Data Protection server to mark an adaptive backup operation against all the running policies. The classification model 308 is used to predict the value for optimal use of resources reducing the cost of running the data protection policies. Using this trained model, the resources are allocated to the most critical data first followed by non-critical data.

To smartly allocate resources to the host, an ML model can be utilized based on the information provided. The first step would involve creating a bit map for the data asset being processed. This bit map can then be compared with the bit map from the last incremental or full backup to detect any changes in the data unit. By fetching the bit map of the current time instant and comparing it with historical data, such as the bit map from the last successful backup or a specific time interval defined by the end user, the analytical unit can determine the data changes and parameter changes. These changes can include factors like the size of changes, data change rate, and resource consumption. Historical data, stored as a micro-unit of a predictor serves as an AI-based analytical model that holds the historic bit map data of the data object being processed This predictor, in conjunction with the model, contains the necessary information to detect data changes from the historic data or bit maps.

To implement this embodiment, any suitable AI algorithm capable of detecting data changes from historical data or bit maps can be utilized. The goal is to obtain a quantifiable metric rather than a quality measure. The analytical unit leverages an AI model trained with historic data to accurately determine the bit map data changes and use them as a reference for comparison with the current bit map changes. In summary, by utilizing an ML model trained with historical bit map data, it becomes possible to predict resource consumption and intelligently allocate resources to the host based on data and parameter changes observed in the current bit map compared to the reference bit map from the last successful backup.

The backup schedule for a group of routine or known clients and data objects is generally defined by default backup policies and priorities, and such policies and data assets demand resources of the system. The resource allocation among data assets being processed is analyzed and reallocated (tuned) as necessary to ensure that critical data assets are provided with the necessary resources for their protection operations.

FIG. 6 is a flowchart that illustrates a method of providing adaptive resource allocation using data criticality for tagged data and clients, under some embodiments. As shown in FIG. 6, process 600 starts in step 602 with the processing of a scheduled data protection policy using the adaptive resource allocation component. This policy could be a manually executed protection policy or it could be the next policy in a set of scheduled policies, or it may be a policy that is invoked upon a backup/restore request acting on a present data asset. If the adaptive resource allocation process is not used for the present dataset, the standard software or scripts for the policy are executed as normal. If a number of policies are lined up for execution in parallel, the adaptive resource allocation can be performed for all of these policies. The data asset may be any appropriate data element or client, such as a virtual machine, filesystem, database, document, and so on The KNN-based adaptive model as trained with historical data, studies the pattern of resource usage for the currently processed data asset and predicts the resource consumption. It quantifies the prediction as an adaptive resource value that is provided to the data protection software running the scheduled protection policy, 604.

The adaptive quantity (resource value) can be calculated using each parameter separately or a number of parameters weighted and summed together, depending on the specific implementation and requirements of the resource allocation system. In the case of the KNN algorithm, each parameter can be considered separately or weighted and summed together to form an adaptive quantity. If each parameter is considered separately, the KNN algorithm would calculate the distance between the current data point (representing the host's resource usage) and its nearest neighbors based on each parameter. The adaptive quantity can then be derived by summing the distances or applying a separate weighting factor to each parameter. If the parameters are instead weighted and summed together, the KNN algorithm assigns weights to each parameter based on their relative importance in resource allocation. The weighted parameters are combined to calculate the adaptive quantity, representing the overall resource requirements.

An optimal resource adjustment can be made based on the calculated adaptive quantity and the available resources. Once the adaptive quantity is determined, it represents the host's resource needs. The allocation system can compare this quantity with the available resources to make informed decisions. The adjustment of resources can involve various actions, such as increasing or decreasing the allocation of CPU, memory, storage, or network bandwidth to the host. The specific resources adjusted will depend on the system architecture and the resource requirements of the workload running on the host. The resource adjustment process involves evaluating the current resource utilization, the adaptive quantity calculated through the KNN algorithm, and any constraints or thresholds defined by the system administrators. Based on these factors, the system can dynamically allocate or reallocate resources to optimize the host's performance and ensure efficient resource utilization.

The adaptive quantity or adjusted adaptive quantity is the used to suggest an optimum allocation to the data protection server, 606. The solution utilizing the KNN algorithm for resource allocation can be applied to suggest an optimum allocation for a data protection server. The first step is to identify the relevant parameters that affect resource allocation, such as data volume, backup frequency, network bandwidth, and processing power. Historical data on resource usage and parameter values is collected to train the KNN model. Once trained, the model can predict resource requirements based on current parameter inputs. By comparing the predicted requirements with the available resources on the data protection server, an optimal resource allocation can be suggested. This may involve adjusting CPU utilization, memory allocation, disk storage, or network bandwidth, taking into account workload prioritization, data transfer rates, system performance thresholds, and predefined policies. Continuous monitoring and adaptation ensure efficient resource utilization and meet the data protection requirements. Implementation details like K value selection, parameter normalization, and resource adjustment mechanisms will depend on the specific server environment.

In step 607, the KNN-based classifier component 304 uses the trained model and the data/client attributes in order to classify the data asset as critical or non-critical. The data object is then tagged with the classified criticality tag, 608.

The resource consumption of the policy is then tuned based on the criticality of the data asset, 610. To tune the resource consumption of a data protection policy based on the criticality of the data asset, a systematic approach can be followed. This process first establishes different levels of criticality to categorize the data assets. It next associates each criticality level with appropriate resource allocation settings, considering factors such as backup frequency, retention period, encryption level, and network bandwidth requirements. It utilizes historical data, including criticality information, to train a machine learning model, which learns the relationships between criticality levels, resource consumption, and optimal resource allocation. When a new data asset needs protection, input its criticality level into the trained model along with other parameters to predict the resource requirements. Based on the predicted requirements and available resources, the process adjusts the resource allocation accordingly. Features such as resource consumption, data protection performance, and criticality levels are continuously monitored to make periodic adjustments as needed. This approach ensures that resources are allocated efficiently, with higher criticality assets receiving appropriate levels of protection, while optimizing resource usage for lower criticality assets.

The data protection policy as tuned in accordance with the data asset criticality is then performed for the asset, 612.

For the embodiment of FIG. 6, the tuning process 610 can be performed as an iterative process over two or more time intervals to further modify or fine tune the resource consumption of the system by the policy as applied to the criticality tagged asset. Thus, as shown in step 614, the policy is run at defined time intervals to gain and train more data to tune the resource consumption, 614. After the policy is run at least once or for the iterative time periods, the backup/restore operation is successfully performed by applied data protection policy, 616.

As used herein, "supervised learning" refers to a subcategory of machine learning (ML) and artificial intelligence (AI) that is defined by the use of labeled datasets to train algorithms that to classify data or predict outcomes accurately. In an embodiment, the KNN process is used for the data classification to classify current and new data objects with respect to criticality (i.e., backup/restore prioritization) and resource utilization within an overall data protection process.

In an embodiment, the adaptive resource allocation component 301 utilizes certain artificial intelligence (AI) and machine learning (ML) processes to evaluate new data objects using various attributes to generate the model 308 and classify data objects and clients as critical or non-critical. Such a process generally uses a training component that continuously trains a machine learning algorithm.

Figure 7:
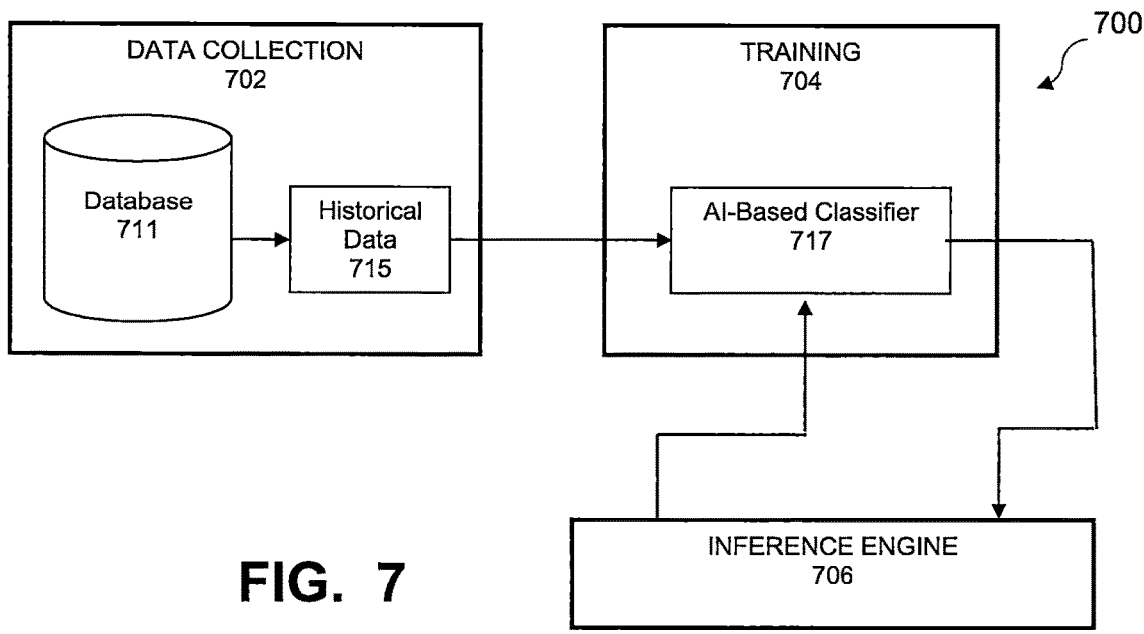
FIG. 7 illustrates a general AI/ML component used in an adaptive resource allocation component, under some embodiments.

FIG. 7 illustrates a general AI/ML component used in an adaptive resource allocation component, under some embodiments. System 700 of FIG. 7 includes a data collection component 702, a training component 704, and an inference component 706. The data collection component 702 can comprise various data loggers and I/O capture devices and databases 711 along with a body of historical information 715 about past data objects, clients, and events (e.g., backup operations). The data collection component 702 continuously monitors and collects data objects and event data to build up its database. This collected information is submitted to the training component 704 through an AI-based analyzer 717. This component continuously trains a machine learning algorithm to identify the data object attributes to thereby determine a relative backup priority of a new data object and/or client. The inference engine 706 also continuously trains the AI/ML algorithms through monitored events.

The AI component of system 700 may employ any suitable AI algorithm, such as KNN or RNN, or similar algorithm. In general, the performance required to handle the vast variation of data source types and huge size of the big data involved, which may be in zeta bytes of range, may be achieved with low latency and high throughput through embodiments described herein. Furthermore, through these AI processes, the decisions to tag the data object as critical or non-critical is done in real-time. Such AI mechanisms may be scaled and modified for different application needs and system configurations.

Figure 8:
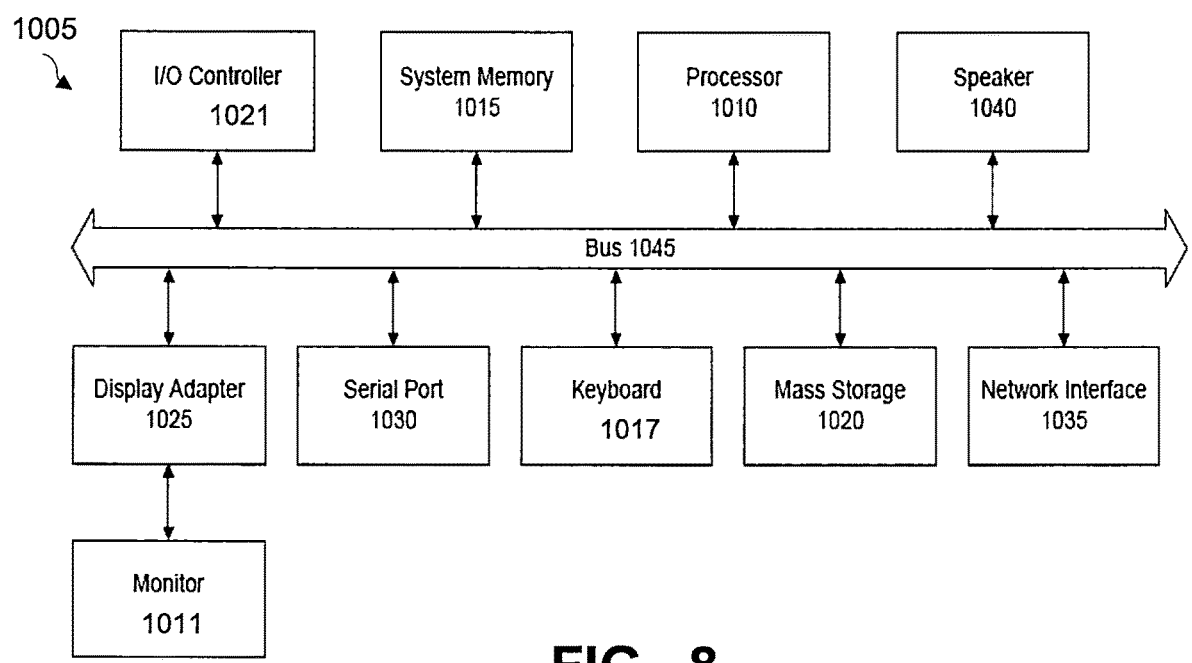
FIG. 8 shows a system block diagram of a computer system used to execute one or more software components of the present system described herein.

The system of FIG. 1 may comprise any number of computers or computing devices in client-server networks including virtual machines coupled over the Internet or similar large-scale network or portion thereof. Each processing device in the network may comprise a computing device capable of executing software code to perform the processing steps described herein. FIG. 8 is a system block diagram of a computer system used to execute one or more software components of the present system described herein. The computer system 1005 includes a monitor 1011, keyboard 1017, and mass storage devices 1020. Computer system 1005 further includes subsystems such as central processor 1010, system memory 1015, input/output (I/O) controller 1021, display adapter 1025, serial or universal serial bus (USB) port 1030, network interface 1035, and speaker 1040. The system may also be used with computer systems with additional or fewer subsystems. For example, a computer system could include more than one processor 1010 (i.e., a multiprocessor system) or a system may include a cache memory.

Arrows such as 1045 represent the system bus architecture of computer system 1005. However, these arrows are illustrative of any interconnection scheme serving to link the subsystems. For example, speaker 1040 could be connected to the other subsystems through a port or have an internal direct connection to central processor 1010. The processor may include multiple processors or a multicore processor, which may permit parallel processing of information. Computer system 1005 is but an example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software.

An operating system for the system may be one of the Microsoft Windows®. family of systems (e.g., Windows Server), Linux, Mac OS X, IRIX32, or IRIX64. Other operating systems may be used.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11.x), near field communication (NFC), radio-frequency identification (RFID), mobile or cellular wireless. For example, signals from a computer may be transferred, at least in part, wirelessly to components or other computers.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor. More than one computer may be used, such as by using multiple computers in a parallel or load-sharing arrangement or distributing tasks across multiple computers such that, as a whole, they perform the functions of the components identified herein; i.e. they take the place of a single computer. Various functions described above may be performed by a single process or groups of processes, on a single computer or distributed over several computers. Processes may invoke other processes to handle certain tasks. A single storage device may be used, or several may be used to take the place of a single storage device.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor. More than one computer may be used, such as by using multiple computers in a parallel or load-sharing arrangement or distributing tasks across multiple computers such that, as a whole, they perform the functions of the components identified herein; i.e., they take the place of a single computer. Various functions described above may be performed by a single process or groups of processes, on a single computer or distributed over several computers. Processes may invoke other processes to handle certain tasks. A single storage device may be used, or several may be used to take the place of a single storage device.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

All references cited herein are intended to be incorporated by reference. While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A computer-implemented method of adaptively allocating resources of a data protection system for application of a data protection policy on a data asset, comprising:
processing the data asset in a present execution of the policy;
analyzing a resource usage of the policy to produce an analyzed resource usage for resources comprising at least one of: CPU utilization, memory allocation, disk storage, and network bandwidth;
predicting, using the analyzed resource usage, a resource consumption by the policy on the data asset during the present execution of a data protection operation on a backup client storing the data asset to facilitate balancing resources used for the data asset to which the policy is applied;
quantifying the resource consumption as an adaptive resource value;
first classifying the backup client as critical or non-critical based on first attributes associated with the backup client;
first tagging the backup client with a client criticality tag;
second classifying the data asset of the first tagged backup client as critical or non-critical based on second attributes associated with the asset, wherein the first and second classifying each comprises a k-nearest neighbors (KNN) algorithm that determines the criticality of the data asset based on the first and second attributes;
second tagging the data asset with a data asset criticality tag after the first tagging to further tag the data asset with the data asset criticality tag along with the client criticality tag;
continuously providing, to a backup server of the data protection system, the predicted resource consumption to mark the data protection operation against all running policies including the policy;
modifying a resource usage of the policy to create an adapted policy based on the data asset criticality tag of the asset and the adaptive resource value to prioritize protection of data based on data criticality of both the data and backup clients to reduce a cost of performing the data protection policy, and to balance the resources used for the data asset; and
backing up the asset in accordance with the adapted policy.

2. The method of claim 1 wherein the data asset comprises at least one of: a filesystem, a directory, a file, a client, or a virtual machine.

3. The method of claim 1 wherein the first attributes are selected from a group consisting of: critical strings, application nature, number of applications, data leg, device ports, data path, datastore size, and provisioning details, and further wherein the second attributes are selected from a group consisting of: data type, data source, data change rate, resource usage, storage requirements, lifecycle, application, and user.

4. The method of claim 3 wherein the data asset criticality tag comprises metadata appended to the data object, and wherein the criticality tag is implemented as an alphanumeric string encoding a protection prioritization based on criticality.

5. The method of claim 4 wherein the data asset criticality tag comprises a key value having a format of "CRITICALITY TAG" with an associated scalar value, wherein the associated value represents a priority value of a corresponding object ranked along a defined scale, and wherein the defined scale is on the order of 1 to 5, in one of ascending or descending order of priority.

6. The method of claim 3 further comprising training a model for the KNN algorithm using historical data of data objects and clients including a present and past users and laboratory environments to establish past resource usage by protection policies applied to user data.

7. The method of claim 6 wherein the classifying utilizes an artificial intelligence (AI) based component comprising a data collection component, a training component, and an inference component, and contains historical information regarding data objects and clients of the network to continuously train a machine learning (ML) algorithm to identify backup prioritization of the user data.

8. The method of claim 6 further comprising:
creating a present bit map for the data asset; and
comparing the present bit map with a previous bit map for the data asset from a previous backup to detect any changes to the data asset to determine data changes to calculate the data change rate, wherein the ML algorithm is used for the comparing, and the AI-based component is trained with the historical information to detect changes between the present bit map and previous bit map to obtain a quantifiable metric of the data changes.

9. A system for adaptively allocating resources of a data protection system for application of a data protection policy on a data asset, comprising:
a physical backup server processing the data asset in a present execution of a data protection operation on a backup client storing the data asset implementing the policy;
a hardware-based analytical component analyzing a resource usage of the policy to produce an analyzed resource usage for resources comprising at least one of: CPU utilization, memory allocation, disk storage, and network bandwidth, and to predict a resource consumption by the data asset during the present execution of a data protection operation on a backup client storing the data asset to facilitate balancing resources used for the data asset to which the policy is applied, and quantifying the resource consumption as an adaptive resource value;
a classifier first classifying the backup client as critical or non-critical based on first attributes associated with the backup client for first tagging of the backup client with a client criticality tag, and second classifying the data asset of the first tagged backup client as critical or non-critical based on second attributes associated with the data asset, wherein the first and second classifying each comprises a k-nearest neighbors (KNN) algorithm that determines the criticality of the data asset based on the first and second attributes for second tagging of the data asset with a data asset criticality tag after the first tagging to further tag the data asset with the data asset criticality tag along with the client criticality tag;

the analytic component further continuously providing, to the backup server, the predicted resource consumption to mark the data protection operation against all running policies including the policy, and modifying a resource usage of the policy to create an adapted policy based on the data asset criticality tag of the asset and the adaptive resource value to prioritize protection of data based on data criticality of both the data and backup clients to reduce a cost of performing the data protection policy; and the backup server further backing up the asset in accordance with the adapted policy.

10. The system of claim 9 wherein the data asset comprises at least one of: a filesystem, a directory, a file, a client, or a virtual machine.

11. The system of claim 10 wherein the first attributes are selected from a group consisting of: critical strings, application nature, number of applications, data leg, device ports, data path, datastore size, and provisioning details, and further wherein the second attributes are selected from a group consisting of: data type, data source, resource usage, storage requirements, lifecycle, application, and user.

12. The system of claim 11 wherein the data asset criticality tag comprises metadata appended to the data object, and wherein the criticality tag is implemented as an alphanumeric string encoding a protection prioritization based on criticality, and further wherein the tag comprises a key value having a format of "CRITICALITY TAG" with an associated scalar value, wherein the associated value represents a priority value of a corresponding object ranked along a defined scale, and wherein the defined scale is on the order of 1 to 5, in one of ascending or descending order of priority.

13. The system of claim 11 further comprising a model trained for the KNN algorithm using historical data of data objects and clients including a present and past users and laboratory environments to establish past resource usage by application of protection policies on user data.

14. The system of claim 13 wherein the classifier utilizes an artificial intelligence (AI) based component comprising a data collection component, a training component, and an inference component, and contains historical information regarding data objects and clients of the network to continuously train a machine learning (ML) algorithm to identify backup prioritization of the user data.

15. The system of claim 14 further comprising a bit map component creating a present bit map for the data asset, and comparing the present bit map with a previous bit map for the data asset from a previous backup to detect any changes to the data asset to determine data changes to calculate the data change rate, wherein the ML algorithm is used for the comparing, and the AI-based component is trained with the historical information to detect changes between the present bit map and previous bit map to obtain a quantifiable metric of the data changes.

16. A tangible computer program product having stored thereon program instructions that, when executed by a process, cause the processor to perform a method of adaptively allocating resources of a data protection system for application of a data protection policy on a data asset, comprising:

processing the data asset in a present execution of the policy;

analyzing a resource usage of the policy to produce an analyzed resource usage for resources comprising at least one of: CPU utilization, memory allocation, disk storage, and network bandwidth;

predicting, using the analyzed resource usage, a resource consumption by the policy on the data asset during the present execution of a data protection operation on a backup client storing the data asset to facilitate balancing resources used for the data asset to which the policy is applied;

quantifying the resource consumption as an adaptive resource value;

first classifying the backup client as critical or non-critical based on first attributes associated with the backup client;

first tagging the backup client with a client criticality tag;

second classifying the data asset of the first tagged backup client as critical or non-critical based on second attributes associated with the asset, wherein the first and second classifying each comprises a k-nearest neighbors (KNN) algorithm that determines the criticality of the data asset based on the first and second attributes;

second tagging the data asset with a data asset criticality tag after the first tagging to further tag the data asset with the data asset criticality tag along with the client criticality tag;

continuously providing, to a backup server of the data protection system, the predicted resource consumption to mark the data protection operation against all running policies including the policy;

modifying a resource usage of the policy to create an adapted policy based on the data asset criticality tag of the asset and the adaptive resource value to prioritize protection of data based on data criticality of both the data and backup clients to reduce a cost of performing the data protection policy, and to balance the resources used for the data asset; and backing up the asset in accordance with the adapted policy.

17. The product of claim 16 wherein the first attributes are selected from a group consisting of: critical strings, application nature, number of applications, data leg, device ports, data path, datastore size, and provisioning details, and further wherein the second attributes are selected from a group consisting of: data type, data source, data change rate, resource usage, storage requirements, lifecycle, application, and user, the method further comprising:

creating a present bit map for the data asset; and comparing the present bit map with a previous bit map for the data asset from a previous backup to detect any changes to the data asset to determine data changes to calculate the data change rate, wherein a machine learning (ML) algorithm is used for the comparing, and an artificial intelligence (AI) based component is trained with the historical information to detect changes between the present bit map and previous bit map to obtain a quantifiable metric of the data changes.

18. The product of claim 17 wherein the data asset criticality tag comprises metadata appended to the data object, and wherein the criticality tag is implemented as an alphanumeric string encoding a protection prioritization based on criticality, and further wherein the tag comprises a key value having a format of "CRITICALITY_TAG" with an associated scalar value, wherein the associated value represents a priority value of a corresponding object ranked along a defined scale, and wherein the defined scale is on the order of 1 to 5, in one of ascending or descending order of priority.

* * * * *